US011050631B2

(12) United States Patent
Rooney et al.

(10) Patent No.: US 11,050,631 B2
(45) Date of Patent: Jun. 29, 2021

(54) SYSTEM AND METHOD FOR ONBOARDING IN A WI-FI MESH NETWORK

(71) Applicant: Minim Inc., Manchester, NH (US)

(72) Inventors: Alec Rooney, Eliot, ME (US); Denis Bakin, Lee, NH (US); Zachary Mattor, Manchester, NH (US)

(73) Assignee: Minim, Inc., Manchester, NH (US)

( * ) Notice: Subject to any disclaimer, the term of this patent is extended or adjusted under 35 U.S.C. 154(b) by 0 days.

(21) Appl. No.: 16/447,296

(22) Filed: Jun. 20, 2019

(65) Prior Publication Data
US 2020/0403875 A1    Dec. 24, 2020

(51) Int. Cl.
*H04L 12/24* (2006.01)
*H04W 76/10* (2018.01)
*H04W 84/18* (2009.01)
*H04W 84/12* (2009.01)

(52) U.S. Cl.
CPC .............. *H04L 41/12* (2013.01); *H04W 76/10* (2018.02); *H04W 84/12* (2013.01); *H04W 84/18* (2013.01)

(58) Field of Classification Search
CPC ............................... H04L 41/12; H04W 76/10
See application file for complete search history.

(56) References Cited

U.S. PATENT DOCUMENTS

| | | | | |
|---|---|---|---|---|
| 2019/0342284 A1* | 11/2019 | Vohra | ........................ | G06K 9/58 |
| 2020/0153686 A1* | 5/2020 | Sarda | ..................... | H04W 12/06 |

* cited by examiner

*Primary Examiner* — Yemane Mesfin
*Assistant Examiner* — Henry Baron
(74) *Attorney, Agent, or Firm* — Peter A. Nieves; Sheehan Phinney Bass & Green PA

(57) ABSTRACT

A network device is onboarded to a Wi-Fi local area network (WLAN) including a WLAN router and a mobile device. An optical symbol displayed on the network device is scanned by the mobile device and used to obtain an onboarding network credential mapped to data encoded in the optical symbol. The onboarding network credential is provided to the WLAN router, which creates an onboarding Wi-Fi network based upon the onboarding network credential. A provisioning parameter is wirelessly conveyed to the network device via the onboarding Wi-Fi network, where the network device was pre-configured to communicate via the onboarding Wi-Fi network.

19 Claims, 8 Drawing Sheets

SYSTEM AND METHOD FOR ONBOARDING IN A WI-FI MESH NETWORK

FIELD OF THE INVENTION

The present invention relates to communication networks, and more particularly, is related to provisioning of a wireless network element.

BACKGROUND OF THE INVENTION

Adding a network element to an existing communication network is known as "onboarding." Common ways to onboard a mesh node to an existing Wi-Fi network include provisioning the mesh node with the Wi-Fi credentials using another type of radio (for example, Bluetooth), connecting to the mesh node using an advertised temporary service set identifier (SSID) and then configuring the mesh node to connect to an existing Wi-Fi network, and using Wi-Fi Protected Setup (WPS). While Bluetooth provides a positive end user experience, provisioning a mesh node involves the mesh node having another radio and/or component built into it, for example, a Bluetooth radio. Since many mesh nodes only have Wi-Fi radios, adding a Bluetooth radio increases the cost of the device.

Another common technique used for onboarding a mesh node to a Wi-Fi network involves the mesh node advertising a temporary Wi-Fi network of its own before the mesh node is configured via the temporary Wi-Fi network to join an existing Wi-Fi network. This can be done without an additional Bluetooth or other radio but may be is a cumbersome process for the user. The user connects a laptop or mobile phone to the custom SSID advertised by the mesh node first, the user configures the mesh node to connect to the existing Wi-Fi network which involves the user remembering network credentials (the SSID and password) for their existing Wi-Fi network and manually entering them into the mesh node via configuration screens.

Onboarding a mesh node to an existing Wi-Fi network with WPS involves pushing a button on both the Wi-Fi router and the mesh node to be added to the Wi-Fi network within a time window, typically a few minutes or less. Often there is little feedback if the WPS process is working, and the WPS process may fail due to timing issues. So while WPS may seem simple it often leads to a very frustrating user experience due to lack of feedback and high rate of failure to pair. Therefore, there is a need in the industry to overcome the abovementioned shortcomings.

SUMMARY OF THE INVENTION

Embodiments of the present invention provide a system and method for onboarding in a Wi-Fi mesh network. Briefly described, the present invention is directed to onboarding a network device to a Wi-Fi local area network (WLAN) including a WLAN router and a mobile device. An optical symbol displayed on the network device is scanned by the mobile device and used to obtain an onboarding network credential mapped to data encoded in the optical symbol. The onboarding network credential is provided to the WLAN router, which creates an onboarding Wi-Fi network based upon the onboarding network credential. A provisioning parameter is wirelessly conveyed to the network device via the onboarding Wi-Fi network, where the network device was pre-configured to communicate via the onboarding Wi-Fi network.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The components in the drawings are not necessarily to scale, emphasis instead being placed upon clearly illustrating the principles of the present invention. The drawings illustrate embodiments of the invention and, together with the description, serve to explain the principles of the invention.

DETAILED DESCRIPTION

Figure 1A:
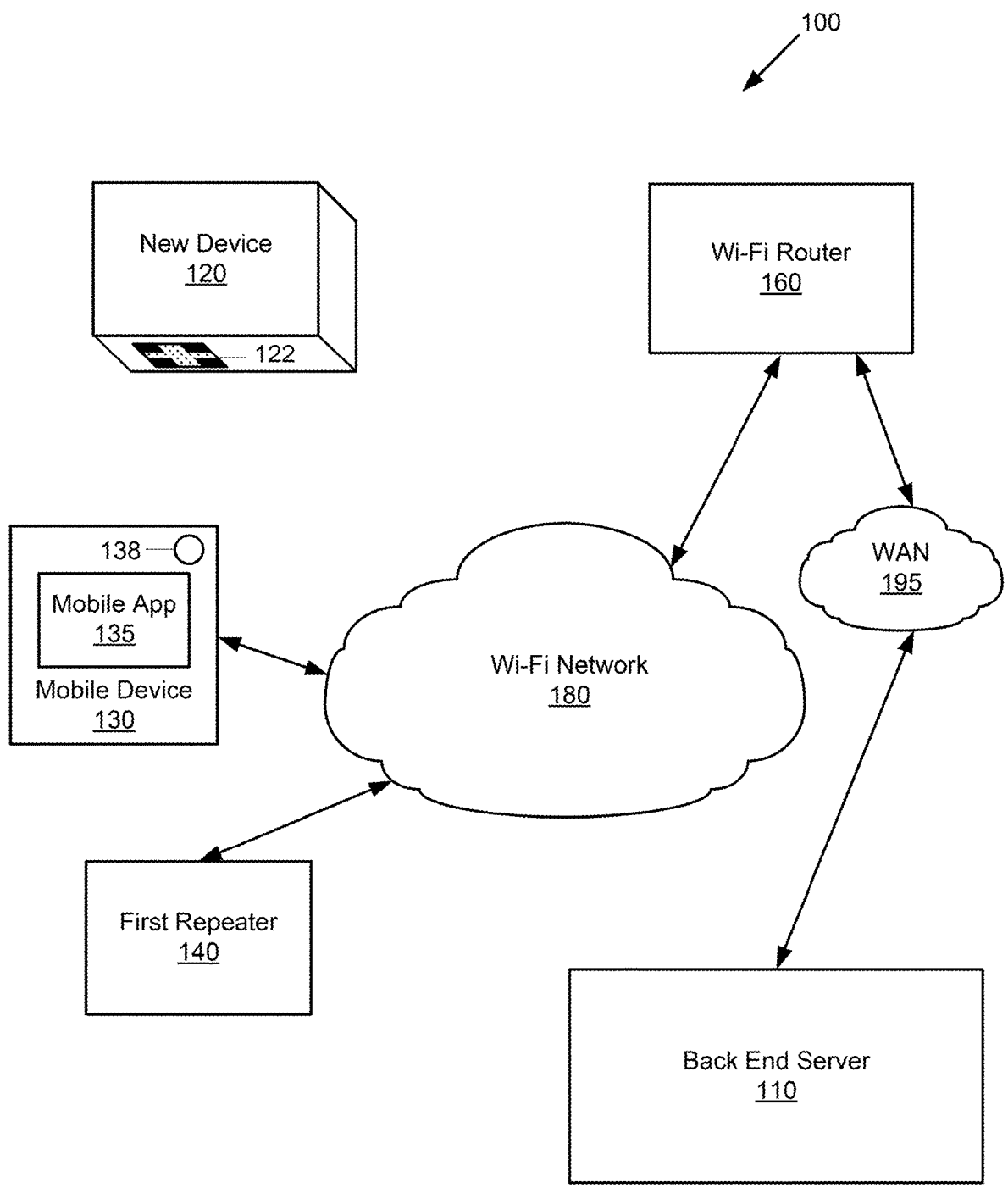
FIG. 1A is a schematic diagram of an exemplary network for a first exemplary embodiment method for onboarding a new device.

The following definitions are useful for interpreting terms applied to features of the embodiments disclosed herein, and are meant only to define elements within the disclosure.

As used within this disclosure, a "network credential" generally refers to one or more data fields used to admit a network element to communicate a communication network. For example, a network credential may include an SSID and/or password for the network.

As used within this disclosure, a "mesh network" refers to a local network topology in which the infrastructure nodes (i.e. routers, bridges, switches, repeaters, and other infrastructure devices) may connect directly, dynamically and non-hierarchically to multiple network nodes and cooperate with one another to efficiently route data from/to other network nodes in a single or multi-hop fashion. While there are different types of mesh networks, unless otherwise specified, references to a mesh network within this document refer to a Wi-Fi mesh network.

As used within this disclosure, "Wi-Fi" refers to Wi-Fi a family of radio technologies that is commonly used for the wireless local area networking (WLAN) of devices which is based around the IEEE 802.11 family of standards. In general, Wi-Fi is used herein to distinguish from other types of wireless networks, for example, Bluetooth and Zigbee.

As used within this disclosure, a "direct connection" refers to a communication link between a first node and a second node of a mesh network where the first node and the second node may communicate without an intervening third node. Similarly, an "indirect connection" refers to a communication between the first node and the second node via one or more intervening nodes therebetween.

As used within this disclosure, a "scannable symbol" refers to a graphical symbol that may be read ("scanned") with an optical device, for example, a camera or laser scanner, such that data associated with and/or encoded within the scannable symbol may be recovered. Examples of a scannable symbol include a barcode, a quick response (QR) code, or just numbers and letters.

As used within this disclosure, "REST" and "RESTful" refer to Representational State Transfer, a software architectural style that defines a set of constraints to be used for creating Web services. Web services that conform to the REST architectural style, called RESTful Web services (RWS), provide interoperability between computer systems on the Internet. Authentication for a RESTful configuration process uses a certificate, for example on a back end server. Remote configuration of network devices described herein may be performed using RESTful configuration, or an analogous technique.

Reference will now be made in detail to embodiments of the present invention, examples of which are illustrated in the accompanying drawings. Wherever possible, the same reference numbers are used in the drawings and the description to refer to the same or like parts.

As shown by FIG. 1A, a first exemplary embodiment method provides for onboarding a mesh network node, here repeater device 120, to a system 100 having an existing mesh network, namely a Wi-Fi local area network 180 (also referred to herein as the WLAN 180). While the first embodiment refers to the onboarded device as a "repeater device" 120 for exemplary purposes, in other embodiments the onboarded device may be any type of Wi-Fi network element, not necessarily a repeater.

The system 100 includes a Wi-Fi router 160 configured to communicate with a plurality of devices in the Wi-Fi network, for example, a first repeater device 140 and a mobile device 130 such as a smart phone, tablet, or laptop. The Wi-Fi router 160 provides a connection to a wide area network (WAN) 195 for devices in the Wi-Fi network 180. The Wi-Fi router 160 may have a wired and/or wireless connection to the WAN 195. A back end server 110, for example, a cloud based server, communicates with devices in the Wi-Fi network 180 via the WAN 195. Note that descriptions of devices in the Wi-Fi network 180 communicating with the back end server 110 refer to communication channels via the Wi-Fi router 160 and WAN 195.

Figure 1B:
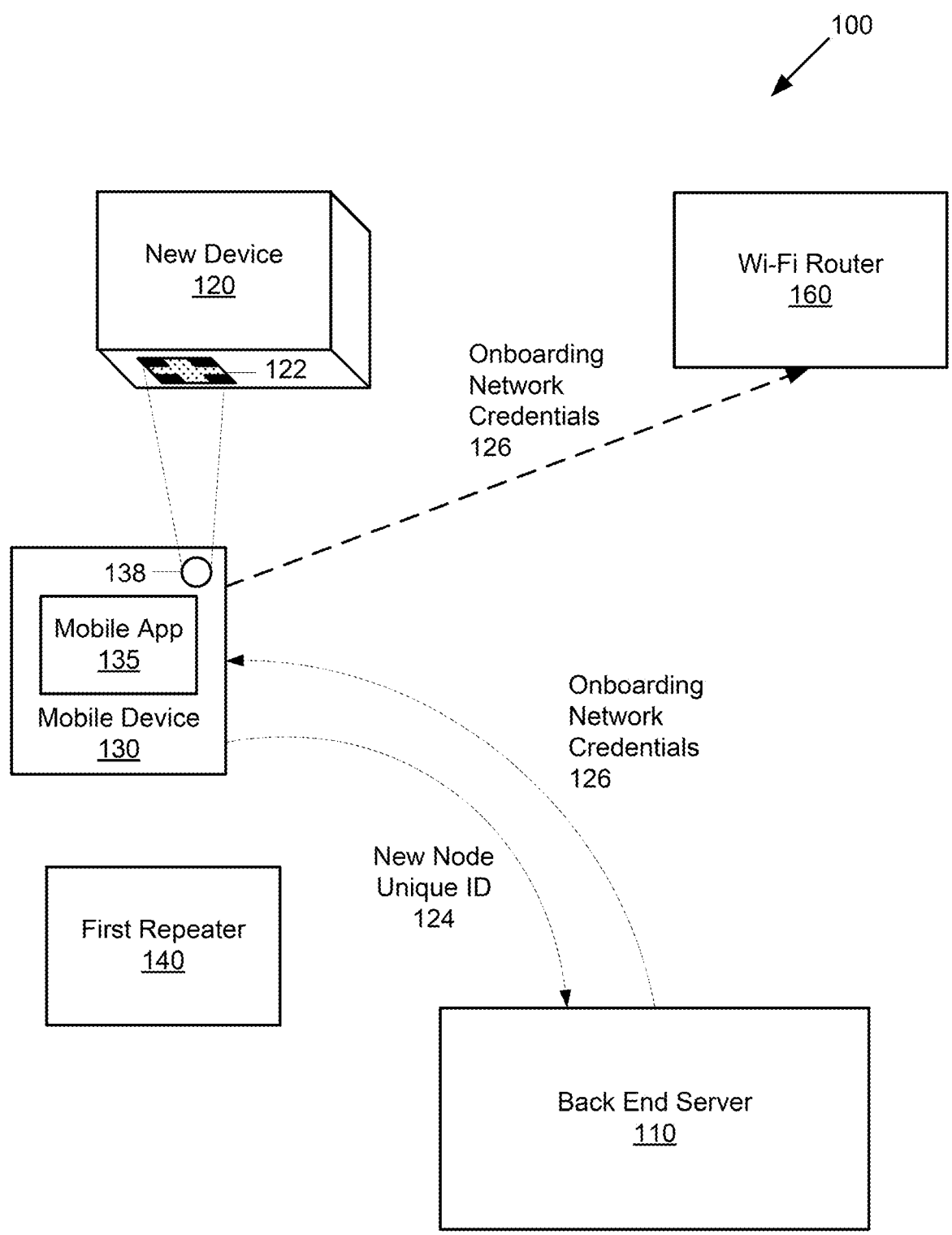
FIG. 1B is a schematic diagram the network of FIG. 1A during a first onboarding operation.

The following description refers to a user onboarding the repeater device 120. A mobile app 135 running on the mobile device 130 may be used to guide the user regarding appropriate placement of the repeater device 120, for example, indicating where to physically place the repeater device 120 according to Wi-Fi radio signal strength from the Wi-Fi router 160. During provisioning the repeater device 120 needs to be within Wi-Fi radio range to communicate with the Wi-Fi router 160. After the repeater device 120 is configured to communicate with the Wi-Fi network 180, the repeater device 120 may be moved to any location in the Wi-Fi network 180 where the repeater device 120 may make a multi-hop connection to the Wi-Fi router 160. When a suitable physical location is selected for the repeater device 120, the user scans an optical symbol 122 such as a QR code displayed by a surface of the repeater device 120, for example with a camera 138 of the mobile device 130 as shown by FIG. 1B. The optical symbol 122 includes encoded data providing a unique ID 124 to uniquely identifying the specific repeater device 120. For example, the unique ID 124 may include and/or be derived from a MAC address and/or serial number for the repeater device 120. The mobile app 135 may decode the unique ID from the optical symbol 122, and forward the unique ID 124 to the back end server 110. Alternatively the mobile app 135 may pass the encoded data to the back end server 110 via the Wi-Fi network where the back end server 110 decodes the unique ID 124.

The unique ID 124 is mapped to a temporary network credential 126 specific to the repeater device 120. For example the temporary network credential 126 may include an SSID and/or a password. As a further example, SSID may be assigned to be the MAC address of the repeater device, and an associated key/password may be mapped to the serial number of the repeater device 120. The repeater device 120 is pre-configured, for example, factory configured, to search for and connect to a Wi-Fi network using the temporary network credential 126 upon startup. The temporary network credential 126 is provided to the Wi-Fi router 160 by the mobile app 135, as shown by FIG. 1B. Alternatively, the temporary network credential 126 may be provided to the Wi-Fi router 160 by the back end server 110. For example, the back end server 110 may access an internally or externally stored lookup table mapping the unique ID 124 to the temporary network credential 126. The temporary network credential 126 may include a temporary network SSID and/or a temporary network password. The temporary network credential 126, temporary network SSID, and temporary network password are herein referred to respectively as the onboarding network credential 126, onboarding network SSID, and onboarding network password for a (temporary) onboarding network 190.

Figure 1C:
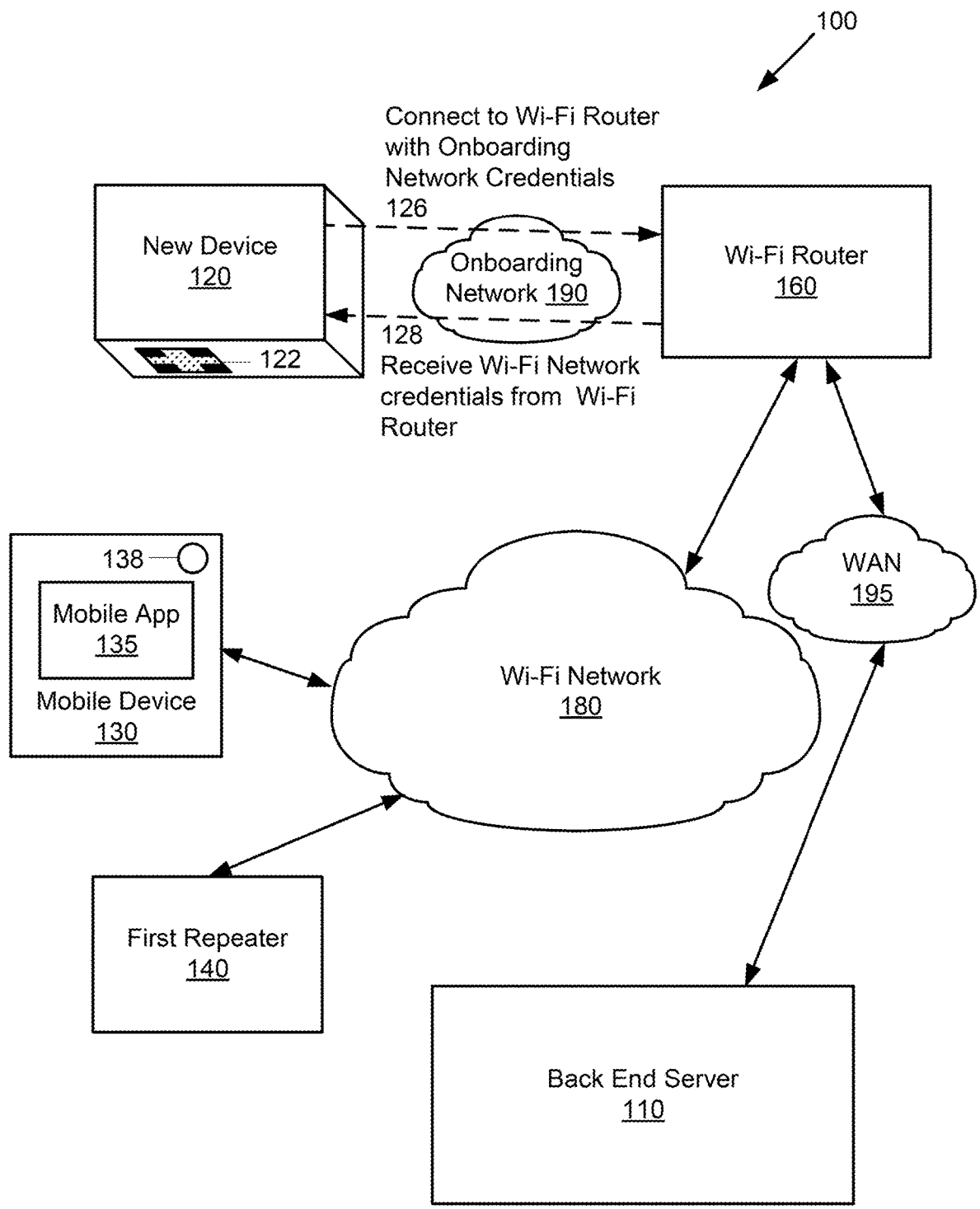
FIG. 1C is a schematic diagram the network of FIG. 1A during a second onboarding operation.

As shown by FIG. 1C, the Wi-Fi router 160 uses the received onboarding network credential 126 to establish an onboarding network 190. For example, the back end server 110 configures the Wi-Fi Router 160 with configuration commands via a RESTful protocol to add the onboarding network SSID from the onboarding network credential 126 so the repeater device 120 can connect to the onboarding network 190. For example, the repeater device 120 can connect to the onboarding network 190 and the router 160 via the first repeater 140 which acts as a virtual access point (VAP) for the onboarding network 190.

The repeater device 120 establishes communication with the Wi-Fi router 160 via the onboarding network 190. For example, the repeater device 120 may be factory configured to search for and connect to the onboarding network 190 using the onboarding network credential 126 in one of several scenarios: upon startup, if no other provisioned Wi-Fi network is detected, for example, after a timeout, after the repeater device 120 loses its connection to the Wi-Fi network 180, and/or after a factory reset of the repeater device 120, among others.

After the repeater device 120 is connected to the Wi-Fi router 160 via the onboarding network 190, the repeater device 120 receives a Wi-Fi network provisioning credential 128 via the onboarding network 190. For example, the repeater device 120 may request the Wi-Fi network provisioning credential 128 from the Wi-Fi router 160, or the repeater device 120 may connect to the back end server 110 via the Wi-Fi router 160 and the WAN 195 and request the Wi-Fi network provisioning credential 128 from the back end server 110. Alternatively, the repeater device 120 may use the onboarding network 190 to establish a communication channel with the mobile app 135 on the mobile device 130 via the Wi-Fi router 160 and the WAN 195 and request the Wi-Fi network provisioning credential 128 from the mobile app 135.

Figure 1D:
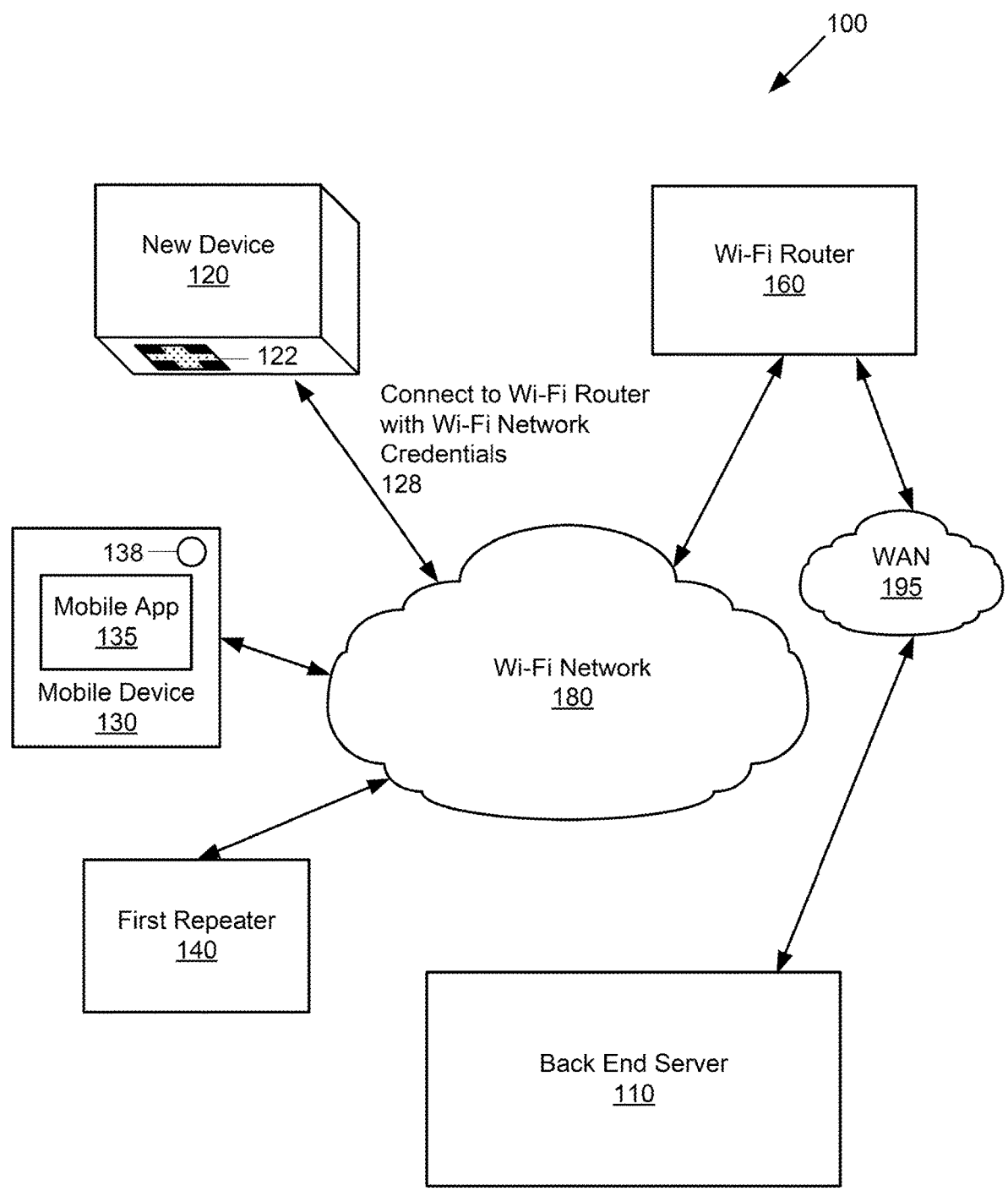
FIG. 1D is a schematic diagram the network of FIG. 1A during a first onboarding operation.

The repeater device 120 connects to the Wi-Fi router 160 via the Wi-Fi network 180 using the Wi-Fi network provisioning credential 128, as shown by FIG. 1D. Besides the Wi-Fi network provisioning credential 128, the repeater device 120 may receive other configuration parameters via the onboarding network 190 and/or the Wi-Fi network 180, for example from the mobile app 135 and/or the back end server 110, and then apply the received configuration parameters, for example, after a self-reset. In this manner, the repeater device 120 may automatically provision itself according to configuration parameters provided by the system 100 without interaction from the user beyond the scanning of the optical symbol 122 with the mobile device 130.

After the repeater device 120 is connected with and synchronized to the Wi-Fi router 160 via the Wi-Fi network 180, the Wi-Fi Router 160 may disable the onboarding network 190 (FIG. 1C), and the repeater device 120 may optionally delete the onboarding network credential 126 from the repeater device 120 memory.

When the repeater device 120 detects that it can talk to the back end server 110 via the onboarding network 190 the repeater device 120 can be fully managed by the back end server 110. The back end server 110 sends the new configuration for the repeater device 120 which includes the network credential 128 and as when the repeater device 120 receives that configuration it applies it and restarts its network so it immediately leaves the onboarding network 190 and joins the Wi-Fi network 180. As discussed above, the repeater device 120 only reverts to using the old configuration and trying to join the onboarding network 190 if it loses its connection to the Wi-Fi network 180 or is factory reset, for example, if the configuration the repeater device received from the back end server 110 is deleted due to a factory reset.

Figure 2:
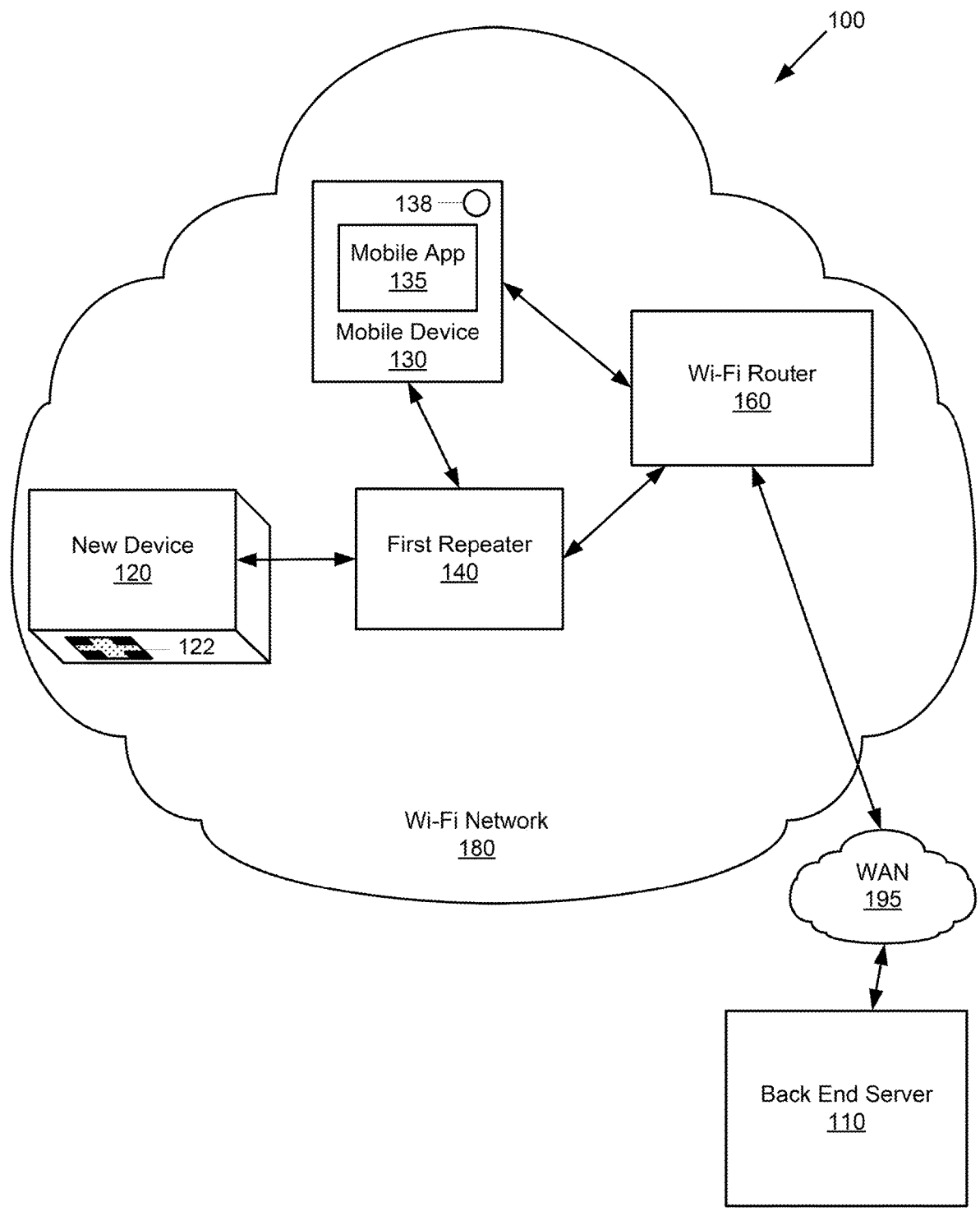
FIG. 2 is a schematic diagram the network of FIG. 1A after onboarding the new device.

As shown by FIG. 2, after the repeater device 120 is configured to communicate with the Wi-Fi network 180, the repeater device 120 may be moved to any physical location in the Wi-Fi network 180 where the repeater device 120 may make a multi-hop connection to the Wi-Fi router 160. For example, as shown by FIG. 2, the repeater device 120 may connect to the Wi-Fi network 180 via the first repeater device 140, even if the repeater device 120 is out of radio range to connect directly to the Wi-Fi router 160. In this manner the repeater device 120 may be used to extend the range of the Wi-Fi network 180.

When a new repeater device 120 is manufactured, it is assigned a unique identifier 124, for example, a MAC address and/or a serial number. The manufacturer of the repeater device 120 maps the unique identifier 124 to a unique onboarding network credential 126, and adds a mapping of the unique identifier 124 and onboarding network credential 126 to a lookup table of mappings, for example, a database accessible to the back end server 110. The unique identifier may be displayed on an exterior surface of the repeater device 120, and/or encoded into a visually scannable optical symbol 122, for example, a QR code, and the optical symbol 122 is displayed upon an exterior surface of the repeater device 120. The new repeater device 120 is preconfigured to communicate via the onboarding network 190 according to the onboarding network credential 126.

As mentioned above, the Wi-Fi router 160 may be configured using a RESTful protocol. For example the Wi-Fi router may be configured by the back end server 110 and/or the mobile app 135. The authentication for this mechanism is done using a certificate that exists on the back end server 110. An agent on the Wi-Fi router 160 verifies that it can talk to the back end server 110 by verifying that certificate and the communication is encrypted using https. Below is an example of a RESTful protocol exchange:

Router 160 sends to server 110: GET https://api.minim.co/v1/lan/:lan_id/commands server 110 responds: get router config command Router 160 sends to server 110: GET https://api.minim.co/v1/lan/:lan_id/router_configs server 110 responds: a new configuration for the router and repeaters (for the whole Wi-Fi network 180) which includes the onboarding VAP Router 160 sends to server 110: POST https://api.minim.co/v1/lan/:lan_id/router_configs which has the current running configuration of the router and repeaters (this allows the server 110 and the mobile app 135 to know that the provisioning network has been successfully configured on the router 160 and repeater devices 120, 140).

Figure 3:
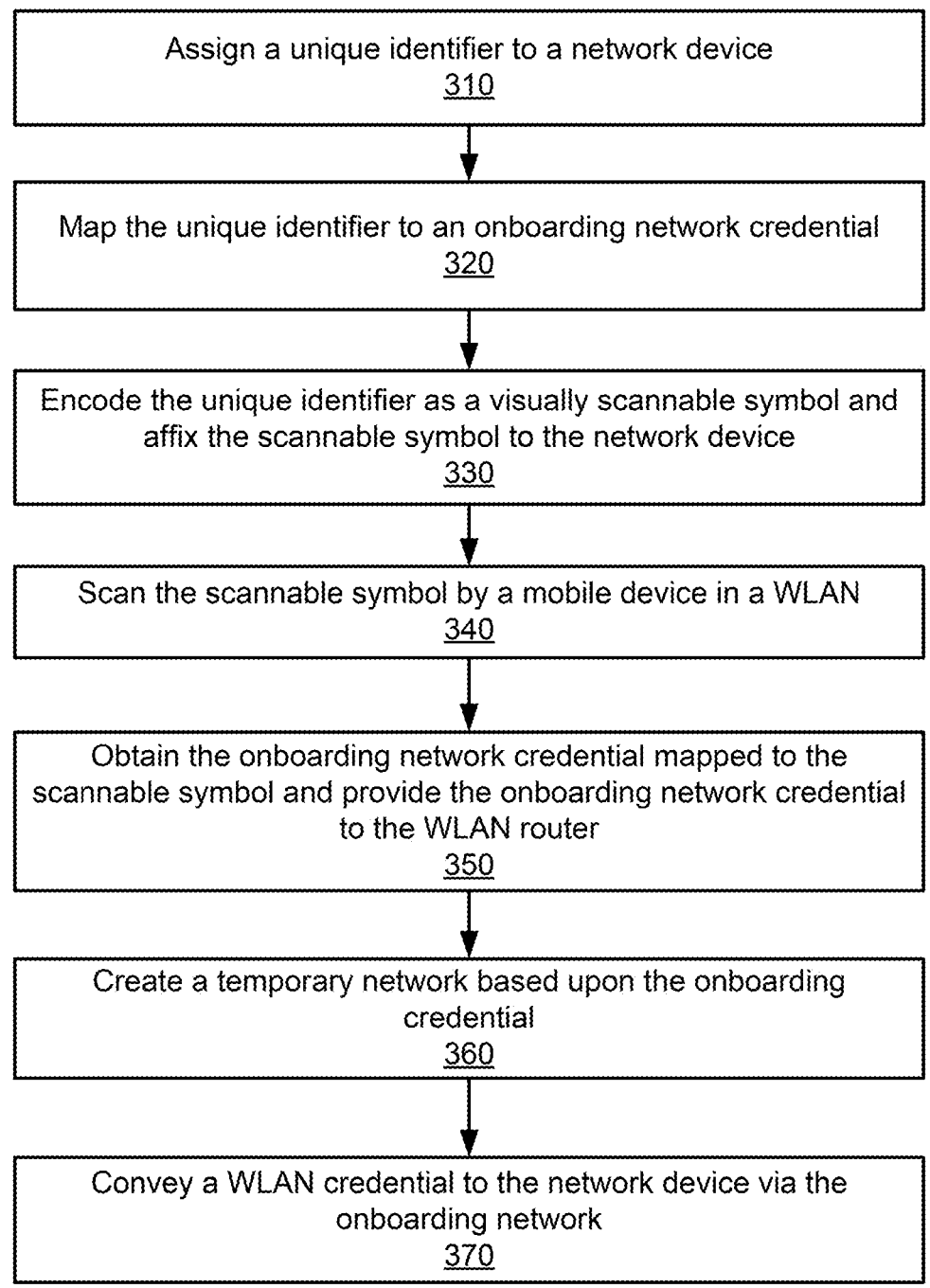
FIG. 3 is a flowchart of a first exemplary embodiment of a method for provisioning a repeater device in a mesh network.

FIG. 3 is a flowchart of a first exemplary embodiment of a method 300 for onboarding a device to a Wi-Fi mesh local area network. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention. The method is described with reference to FIGS. 1A-1D.

A unique identifier 124 is assigned to a network device 120, for example a repeater device 120 as shown by block 310. For example, the unique identifier may be at least partially derived from a MAC address and/or a serial number for the network device 120. The unique identifier 124 is mapped to a unique onboarding network credential 126, as shown by block 320. The unique identifier is encoded in a scannable optical symbol 122, for example, a QR code, and the optical symbol 122 is displayed upon an exterior surface of the network device 120, as shown by block 330.

The optical symbol 122 is scanned by a mobile device in communication with a WLAN 180, as shown by block 340. The onboarding network credential 126 mapped to the optical symbol 122 is obtained, for example from a back end server 110, and the onboarding network credential 126 is provided to a router 160 for the WLAN, as shown by block 350. An onboarding network 190 is created by the WLAN router 160 based upon the onboarding network credential 126, as shown by block 360. The WLAN router 160 conveys a WLAN credential 128 to the network device 120 via the onboarding network 190, as shown by block 370.

Thereafter, the network device 120 uses the WLAN credential 128 to connect to the WLAN 180. The WLAN router 160 then optionally disables the onboarding network 190. It should be noted that while subsequent devices may be onboarded to the WLAN 180 in a similar fashion, each onboarding network credential 126 are preferably unique to each onboarding network 190 and each of the subsequent devices.

Figure 4:
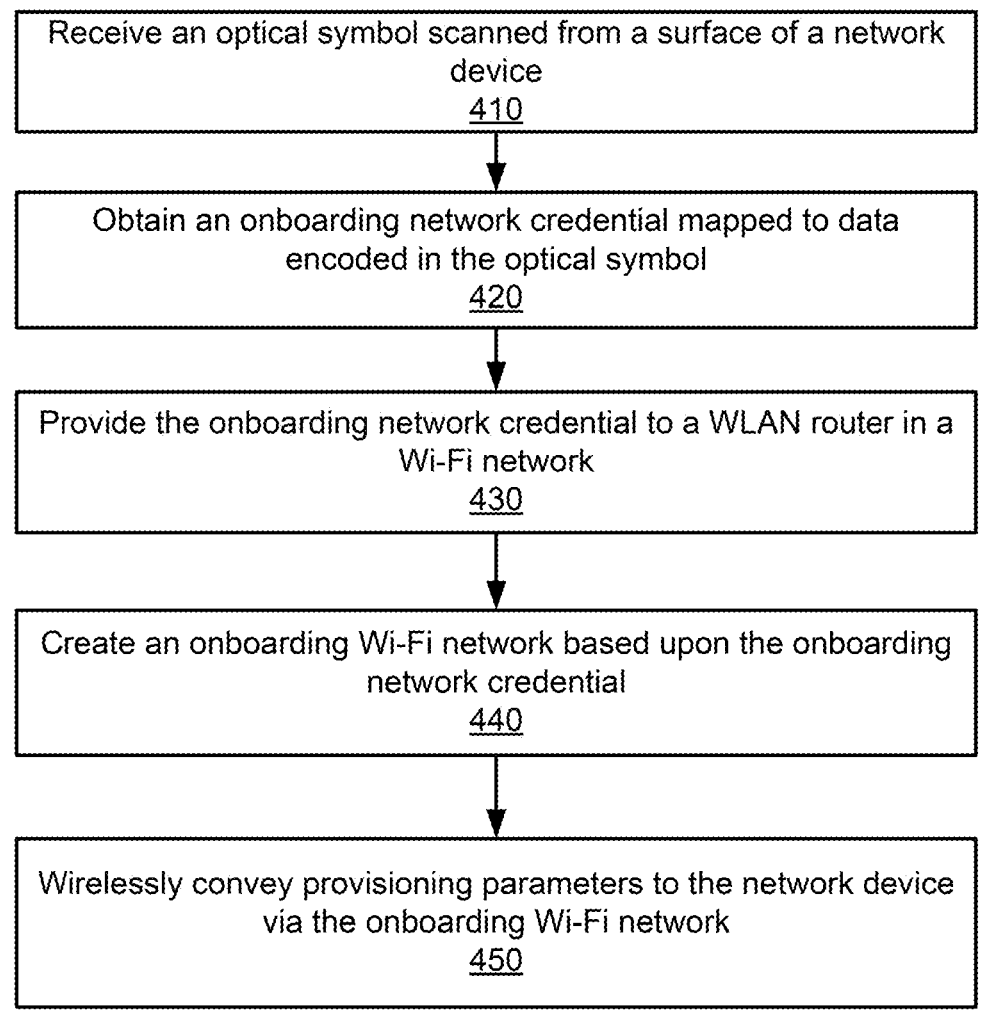
FIG. 4 is a flowchart of a second exemplary embodiment of a method for onboarding a network device to a Wi-Fi local area mesh network (WLAN) having a WLAN router and a mobile device.

FIG. 4 is a flowchart of a second exemplary embodiment of a method 400 for onboarding a network device to a Wi-Fi local area mesh network (WLAN) having a WLAN router and a mobile device. A scanned optical symbol is received on the network device by the mobile device, as shown by block 410. For example, the mobile device may scan the optical symbol from the surface of the network device. The optical symbol may be letters/numbers, or may be a graphical symbol encoding data. An onboarding network credential mapped to data encoded in the optical symbol is obtained, as shown by block 420. For example, the data encoded in the optical symbol may be used to access the onboarding network credential from a database or lookup table.

The onboarding network credential is provided to the WLAN router, as shown by block 430. An onboarding Wi-Fi network based upon the onboarding network credential is created, for example by the WLAN router, as shown by block 440. The network device is pre-configured to communicate via the onboarding Wi-Fi network. Provisioning parameters are wirelessly conveyed to the network device via the onboarding Wi-Fi network, as shown by block 450. For example, the provisioning parameters may include WLAN credentials, so that the network device may join the WLAN.

Figure 5:
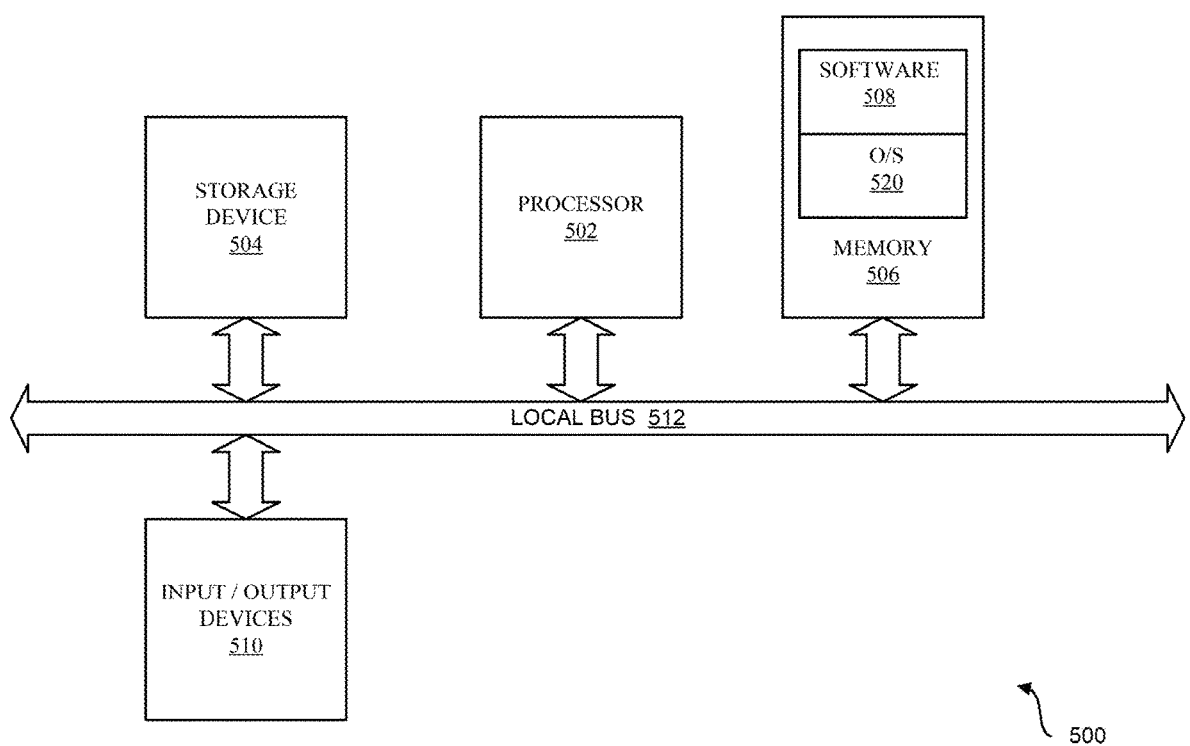
FIG. 5 is a schematic diagram illustrating an example of a system for executing functionality of the present invention.

The present system for executing the functionality of the system 100 described in detail above may be a computer, an example of which is shown in the schematic diagram of FIG. 5. The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for onboarding a network device into a Wi-Fi local area mesh network (WLAN) comprising a WLAN router and a mobile device, comprising the steps of:
   assigning a unique identifier to the network device;
   mapping the unique identifier to an onboarding network credential;
   encoding the unique identifier into an optically scannable symbol;
   displaying the optically scannable symbol by the network device;
   scanning the optically scannable symbol by the mobile device;
   obtaining the onboarding network credential mapped to the optically scannable symbol;
   providing the onboarding network credential to the WLAN router;
   creating an onboarding Wi-Fi network based upon the onboarding network credential; and
   wirelessly conveying a WLAN credential for the WLAN to the network device via the onboarding Wi-Fi network,
   wherein the onboarding network credential comprises one or more data fields admitting the network device to communicate via the onboarding Wi-Fi network.

2. The method of claim 1, further comprising the step of preconfiguring the network device to communicate via the onboarding Wi-Fi network.

3. The method of claim 1, further comprising the step of the network device using the Wi-Fi mesh network credential to join the WLAN.

4. The method of claim 3, further comprising the step of disabling the onboarding Wi-Fi network.

5. The method of claim 3, further comprising the step of physically positioning the network device in proximity of the WLAN router within a direct connection radio range of the WLAN router.

6. The method of claim 5, further comprising the steps of:
   physically moving the network device outside of the direct connection radio range of the WLAN router; and
   establishing an indirect network connection to the WLAN router.

7. The method of claim 1, wherein obtaining the onboarding network credential further comprises the step of requesting the onboarding network credential from a back end server in communication with the WLAN router via a wide area network (WAN).

8. The method of claim 7, wherein requesting onboarding network credential further comprises conveying the optically scannable symbol to the back end server.

9. The method of claim 7, further comprising the step of decoding the optically scannable symbol to obtain the unique identifier.

10. The method of claim 9, wherein requesting onboarding network credential further comprises conveying the unique identifier to the back end server.

11. A Wi-Fi mesh local area network (WLAN) system, comprising;
    a network device comprising a unique identifier mapped to an onboarding network credential encoded in an optically scannable symbol displayed by the network device;
    a WLAN router; and
    a mobile device configured to communicate in the WLAN comprising a camera, a processor and a memory configured to store non-transitory instructions that when executed by the processor perform the steps of:
       scanning the optically scannable symbol with the camera;
       obtaining the onboarding network credential mapped to the optically scannable symbol; and
       providing the onboarding network credential to the WLAN router;
    wherein the WLAN router is configured to perform the steps of:
       creating an onboarding Wi-Fi network based upon the onboarding network credential; and
       wirelessly conveying a WLAN credential for the WLAN to the network device via the onboarding Wi-Fi network,
    wherein the onboarding network credential comprises one or more data fields admitting the network device to communicate via the onboarding Wi-Fi network.

12. The system of claim 11, wherein the network device is pre-configured to communicate via the onboarding Wi-Fi network.

13. The system of claim 11, further comprising a back end server in communication with the WLAN via a wide area network (WAN) configured to provide the onboarding network credential based upon data associated with the optically scannable symbol.

14. The system of claim 13, wherein data associated with the optically scannable symbol comprises a unique identifier associated with the network device.

15. The system of claim 14, further comprising the step of decoding the optically scannable symbol to obtain the unique identifier.

16. The system of claim 15, wherein obtaining the onboarding network credential further comprises conveying the unique identifier to the back end server.

17. A method for onboarding a network device into a Wi-Fi local area network (WLAN) comprising a WLAN router and a mobile device, comprising the steps of:
    receiving a scanned optical symbol displayed on the network device by the mobile device;
    obtaining an onboarding network credential mapped to data encoded in the optical symbol;
    providing the onboarding network credential to the WLAN router;
    creating an onboarding Wi-Fi network based upon the onboarding network credential; and wirelessly conveying a provisioning parameter to the network device via the onboarding Wi-Fi network, wherein the network device is pre-configured to communicate via the onboarding Wi-Fi network, wherein the onboarding network credential comprises one or more data fields admitting the network device to communicate via the onboarding Wi-Fi network.

18. The method of claim 17, wherein the provisioning parameter comprises a WLAN credential for the WLAN.

19. The method of claim 17, wherein obtaining an onboarding network credential mapped to data encoded in the optical symbol further comprises the steps of:

mapping a unique identifier assigned to the network device to an onboarding network credential;

storing the mapped unique identifier and the onboarding network credential in a lookup table;

receiving the unique identifier in a request for the onboarding network credential;

using the unique identifier to access the onboarding network credential in the lookup table; and providing the onboarding network credential in response to the request for the onboarding network credential.

\* \* \* \* \*